Nov. 6, 1962     H. A. BEEKHUIS     3,062,619
CONVERSION OF METAL CHLORIDES TO THE CORRESPONDING METAL NITRATES
Filed Sept. 26, 1960     2 Sheets-Sheet 1
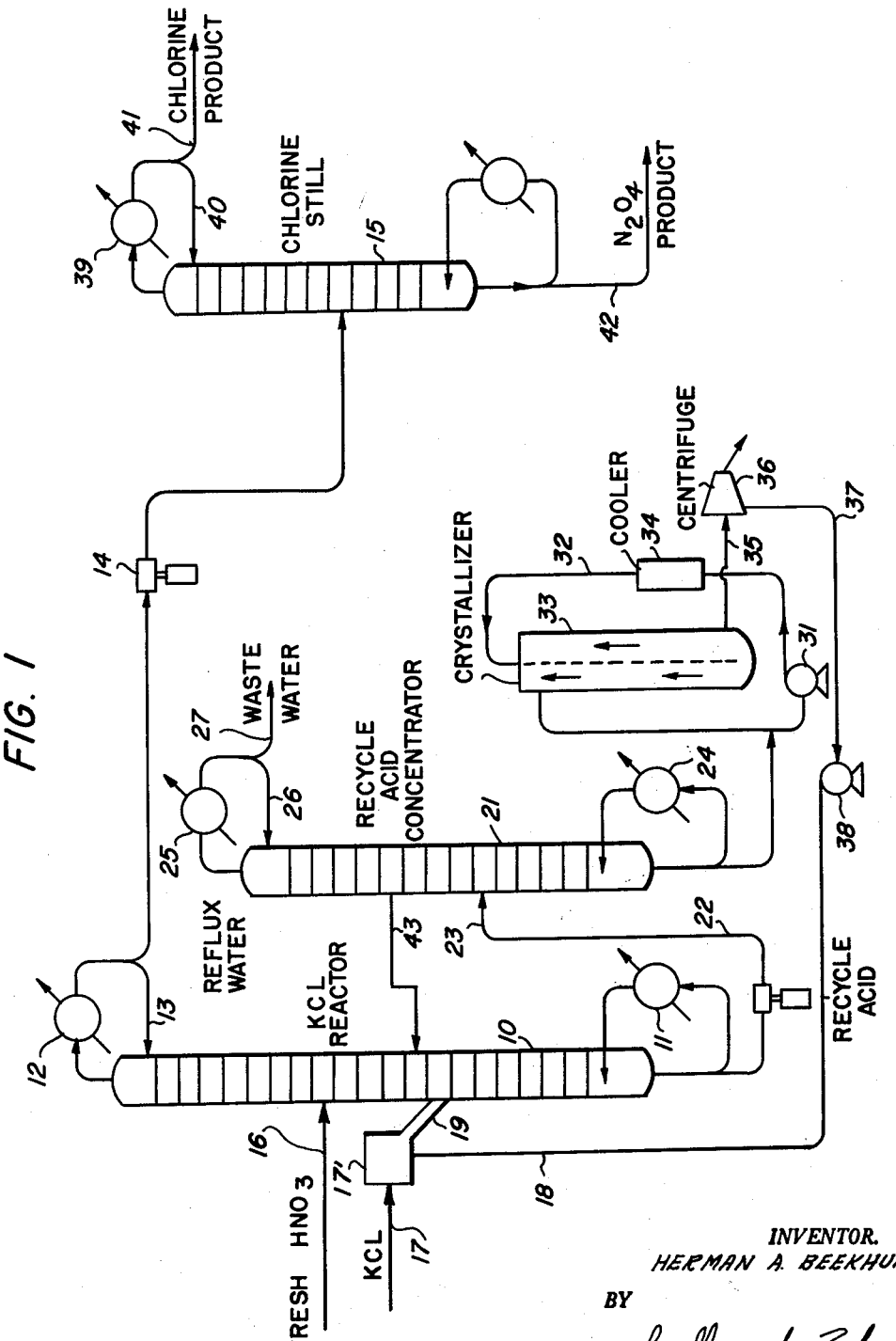
FIG. I
INVENTOR.
HERMAN A. BEEKHUIS
BY
ATTORNEYS

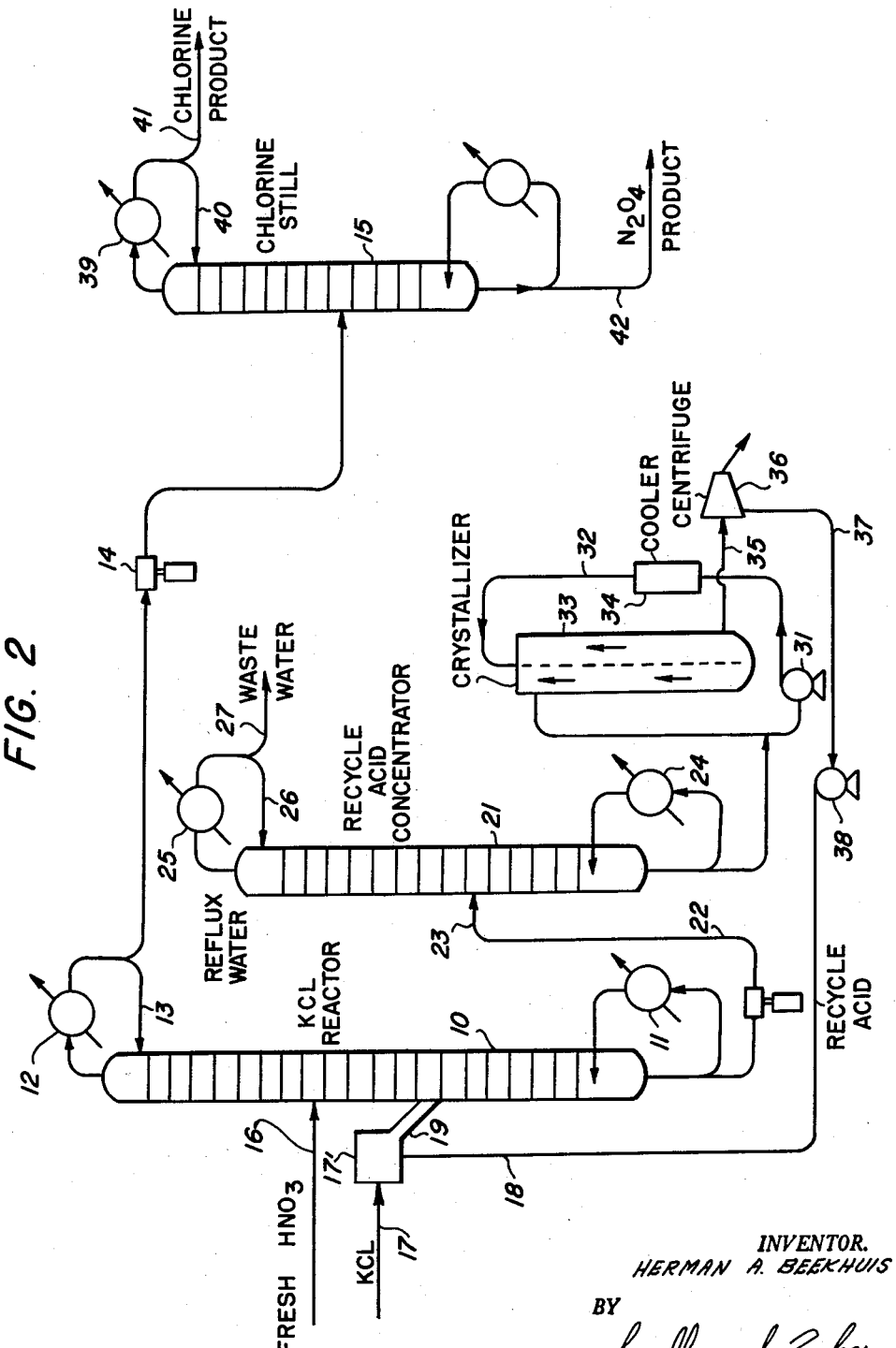

United States Patent Office 3,062,619
Patented Nov. 6, 1962

3,062,619
CONVERSION OF METAL CHLORIDES TO CORRESPONDING METAL NITRATES
Herman A. Beekhuis, Mount Alverno Road, Media, Pa.
Filed Sept. 26, 1960, Ser. No. 58,518
8 Claims. (Cl. 23—102)

This invention relates to the conversion of alkali metal and alkaline earth metal chlorides (particularly potassium chloride) to the corresponding alkali and alkaline earth metal nitrates.

Potassium nitrate, as is well known, is useful as a fertilizer, a constituent of mixed fertilizers, and as a raw material in many processes. This invention will hereinafter be described in connection with the conversion of potassium chloride to potassium nitrate, but it will be understood, it is not limited thereto and includes the conversion of other alkali metal chlorides, such as sodium, and alkaline earth metal chlorides, such as calcium, to the corresponding nitrates.

The reaction of potassium chloride with nitric acid to produce potassium nitrate, nitrosyl chloride and chlorine, the oxidation of the nitrosyl chloride to produce nitrogen dioxide ($2NO_2 \rightleftharpoons N_2O_4$) and chlorine, the separation of the nitrogen dioxide from the chlorine and the reaction of the nitrogen dioxide thus separated with potassium chloride in the presence of nitric acid or with water and oxygen to produce nitric acid for use in the process has been suggested.

It is among the objects of the present invention to provide a process of converting potassium chloride to potassium nitrate which results in economically attractive high yields of potassium nitrate and yet eliminates the necessity of employing an oxidation treatment comparable to the oxidation of nitrosyl chloride employed in heretofore known procedures.

It is another object of this invention to provide such process which is comparatively simple to carry out and requires for its practice less equipment than prior known techniques for producing potassium nitrate from potassium chloride.

Still another object of this invention is to provide such process which results in the production of acid liquors of a character such as to minimize corrosion problems in the handling thereof, particularly in the crystallizer and equipment associated therewith for effecting separation of the potassium nitrate crystals from the mother liquor.

Other objects and advantages of this invention will be apparent from the following detailed description thereof taken in connection with the accompanying drawings in which:

FIGURE 1 is a diagrammatic layout of the equipment for practicing one embodiment of the invention; and FIGURE 2 is a diagrammatic layout of the equipment for practicing another embodiment of the invention.

The process of this invention involves three stages or steps, which will be numbered sequentially for purposes of facilitating a description of the invention. It will be appreciated the process is continuous. These stages take place concurrently and the numbers do not indicate any sequence in the point of time.

In the first stage, potassium chloride is reacted with nitric acid having a strength of at least 75% by weight, preferably from 80% to 100% by weight, in the proportions of about 2 mols of nitric acid per mol of potassium chloride by flowing the nitric acid introduced near the top of a distillation column and the potassium chloride introduced at a point below the nitric acid downwardly countercurrent to a rising stream of vapors of nitrogen dioxide, nitrosyl chloride and chlorine produced by boiling the reaction mixture at the base of the column. A recycle stream of nitric acid containing from 50% to 65% by weight of nitric acid on a salt-free basis, preferably from 50% to 60% nitric acid, which stream preferably is the mother liquor from which the potassium nitrate crystal product has been separated, is passed through this column to maintain the acid concentration therein at a level to give high yields of potassium nitrate.

The vapors consisting of chlorine and nitrogen dioxide are taken off overhead from the top of the column, maintained at a temperature of from −5° C. to −10° C., condensed and a portion of the condensate returned as reflux. The amount thus returned is preferably from 40% to 60% of the total condensate removed overhead. The amount of reflux returned to the column can be reduced by inserting a water cooled coil about half way between the nitric acid feed point and the top of the column. The remainder of this condensate consisting of a mixture of chlorine and nitrogen dioxide in the proportions of 2 mols of nitrogen dioxide per mol of chlorine may be fractionated to remove chlorine as product. The nitrogen dioxide may be reacted with water and oxygen to form nitric acid employed in the process.

The bottoms from this column contains potassium nitrate, some sodium nitrate formed from the sodium chloride invariably present as an impurity in the potassium chloride, water and nitric acid, the latter in amount of from 45% to 55% by weight on a salt-free basis.

When the reaction is carried out in the first stage so that the bottoms contain less than 55% nitric acid on a salt-free basis, say about 50%, the bottoms will also contain hydrogen chloride in amount of about 0.1% by weight. On the other hand, when the reaction is conducted so as to produce as bottoms a reaction mixture containing about 55% nitric acid or more on a salt-free basis, then the hydrogen chloride concentration will be less than about 0.05% by weight. In the latter case, the hydrogen chloride in the bottoms can conveniently be taken off overhead in step 2 as hereinafter described.

Should the reaction mixture removed as bottoms from step 1 contain more than about 0.1% hydrogen chloride, the hydrogen chloride is removed in step 2 and recycled to the distillation column in step 1 where it reacts with nitric acid forming chlorine, nitrogen dioxide and water, which chlorine and nitrogen dioxide are removed overhead from the distillation column in step 1.

Step 2: The reaction mixture removed as bottoms from step 1 is introduced into a distillation column where it is subjected to distillation flowing downwardly in the base portion of the column countercurrent to a rising stream of vapor produced by boiling the reaction mixture at the base of the column. This column is maintained at a temperature of about 120° C. at the base and 100° C. at its top. Operating with the reactor bottoms containing about 50% nitric acid on a salt-free basis, and hence containing about 0.1% hydrochloric acid, as the vapors rise in the column they tend to become more and more concentrated with respect to their hydrochloric acid content. At a point in the column approximately one-third from the top, a vapor mixture is formed containing approximately 3 mols of hydrochloric acid per mol of nitric acid. Above this point little or no hydrochloric acid is present. At the top of the column the vapors consist substantially entirely of water. These vapors are removed, condensed and a portion returned as reflux. The amount thus returned is from 25% to 50% of the vapors removed overhead.

At the point of the column where the hydrochloric acid vapors concentrate and are present in approximately the proportions of 3 mols of hydrochloric acid per mol of nitric acid, a side stream is removed and introduced into the distillation column employed in the first stage where the hydrochloric acid reacts with the nitric acid to produce chlorine, nitrogen dioxide and water; this side stream contains up to about 12% hydrochloric acid.

In the alternative procedure in which the reaction mixture removed as bottoms contains 55% by weight or more of nitric acid on a salt-free basis, the chloride content is so low that it can be efficiently removed overhead from the concentrating column employed in step 2. In this mode of operation, the temperatures in the column are substantially the same as in the first described method in which a side stream is removed from the concentrating column and is fed to the reactor column. No side stream is removed from the concentrating column in this alternative mode of operation. The overhead vapors containing a small amount of hydrochloric acid are condensed, from 25% to 50% of the condensate returned as reflux and the remainder of the condensate may be passed to waste.

Step 3: The concentrated reaction mixture from step 2 containing from 55% to 65% by weight of nitric acid on a salt-free basis is passed to the crystallizer where the potassium nitrate is crystallized. These crystals are separated from the mother liquor. The mother liquor containing from 55% to 65% by weight of nitric acid on a salt-free basis, as hereinabove described, is recycled through the distillation column employed in step 1.

In FIGURE 1 of the drawing, 10 is a distillation column provided with a boiler 11 at its base. A condenser 12 is arranged to receive the vapor stream coming off from the top of distillation column 10. The condensate from condenser 12 is divided into two streams, one of which is returned as reflux through line 13 and the other pumped by pump 14 to the chlorine still 15. Fresh nitric acid is supplied to the reactor 10 through line 16. The potassium chloride feed is supplied by line 17 to a slurry mixer 17' into which the recycle acid is supplied through line 18. The resultant slurry enters the reactor 10 through line 19. In the base of reactor 10 the mixture is maintained at its boiling point which, when the column is operated under atmospheric pressure conditions, is approximately 115° C. The top of this column is at a temperature of —5° C. to —10° C., preferably —7° C. The fresh nitric acid is introduced through line 16 at a point in the column where the temperature is about 90° C.

The recycle acid concentrator 21 is in the form of a distillation column which communicates through line 22 with the base of the potassium chloride reactor 10 so that the bottoms from this reactor flow continuously through line 22 leading into column 21 at point 23. A boiler 24 communicates with the base of this column for maintaining the reaction products at the boiling point, i.e., about 120° C.

The top of this column communicates with a condenser 25 for condensing the vapor leaving the column. The condensate is divided into two streams, one of which is returned as reflux through line 26 and the other is removed through line 27.

Pump 31 pumps the concentrated slurry from concentrator 21 through the circulating system 32 of the crystallizer 33; circulating system 32 comprises a cooler 34. The cooled liquid is mixed with the concentrated slurry and the mixture is pumped into the crystallizer 33. Crystals are withdrawn from the base of the crystallizer 33 through the line 35 and enter the centrifuge 36 which effects the separation of the potassium nitrate crystals from the mother liquor. The mother liquor is pumped by pump 38 through the line 37 into the slurry mixer 17'.

The overhead from the reactor 10 is pumped into chlorine still 15 where it is fractionated, the chlorine going off overhead and condensed in condenser 39. A portion of the chlorine is returned to chlorine still 15 through line 40 as reflux liquid and the remainder removed as product through line 41. Nitrogen oxides are removed as bottoms through line 42 and can be reacted with water and oxygen to produce nitric acid to supply fresh nitric acid for the process.

FIGURE 1 differs from FIGURE 2 chiefly in that the acid concentrator 21 is provided with a line 43 leading to the reactor 10. A side stream is removed through this line from the acid concentrator, which stream contains 2 to 3 mols of hydrochloric acid per mol of nitric acid.

The following examples are given for purposes of illustrating the invention. It will be understood the invention is not limited to these examples. In these examples all pound values are pounds per hour, percentages are on a weight basis, and temperatures are in ° C.

*Example 1*

This example is carried out in equipment of the type shown in FIGURE 1.

Step 1: 157.5 pounds of nitric acid of 80% concentration containing 126 pounds (2 mols) of nitric acid and 31.5 pounds of water are introduced into the potassium chloride reactor at a point where the temperature is about 90° C. Introduced into this reactor at approximately its midpoint, which is below the point of introduction of the nitric acid, is a slurry of potassium chloride produced by mixing 74.5 pounds (1 mol) of potassium chloride with the recycle acid stream in amount of 866.5 pounds consisting of 315 pounds nitric acid, 257.5 pounds water, 206.0 pounds potassium nitrate and 88.0 pounds sodium nitrate. This recycle acid stream contains 55% nitric acid on a salt-free basis. The temperature at the base of the reactor is 115° C. and at the top —5° C.

Also introduced into the reactor is a side stream removed from the acid concentrator employed in step 2 which side stream is in amount of 10.0 pounds and consists of 0.5 pound of nitric acid, 8.9 pounds water and 0.6 pound hydrochloric acid.

The vapors taken off overhead are cooled to a temperature of —25° C. The condensate thus produced is divided into two streams. One stream in amount of 81.5 pounds consisting of 35.5 pounds of chlorine and 46.0 pounds nitrogen dioxide is returned as reflux. The other or second stream in amount of 81.5 pounds consisting of 35.5 pounds chlorine and 46.0 pounds nitrogen dioxide is passed to the chlorine still where the nitrogen dioxide is separated from the chlorine.

1027.0 pounds of reactor bottoms is removed containing 50% nitric acid on a salt-free basis. The reactor bottoms contain 315.5 pounds nitric acid, 315.9 pounds water, 0.6 pound hydrochloric acid, 307 pounds potassium nitrate and 88 pounds sodium nitrate.

Step 2: The reactor bottoms are introduced into the acid concentrator operated at a temperature of 120° C. at its base and 100° C. at its top. The vapors taken overhead are condensed and the condensate divided into two streams. One of these is returned as reflux in amount of 34.6 pounds consisting entirely of water. The other stream consisting of 49.5 pounds water is passed to waste. Bottoms from the acid concentrator are removed in amount of 967.5 pounds consisting of 315 pounds nitric acid, 257.5 pounds water, 307 pounds potassium nitrate and 88 pounds sodium nitrate. It contains 55 weight percent nitric acid on a salt-free basis.

Step 3: The bottoms from the acid concentrator are cooled to 40° C. and introduced into the crystallizer. A slurry of crystals are withdrawn from the crystallizer and passed through a centrifuge. 101 pounds of potassium nitrate (1 mol) are removed from the centrifuge. The mother liquor in amount of 866.5 pounds consisting of 315 pounds nitric acid, 257.5 pounds water, 206 pounds potassium nitrate and 88 pounds sodium nitrate is recycled to the potassium chloride reactor. It contains about 55 weight percent nitric acid on a salt-free basis.

Example II

This example is also carried out in equipment of the type shown in FIGURE 1.

Step 1: 157.5 pounds of nitric acid of 80% concentration containing 126 pounds (2 mols) of nitric acid and 31.5 pounds of water are introduced into the potassium chloride reactor at a point where the temperature is about 90° C. Introduced into this reactor at approximately its midpoint, which is below the point of introduction of the nitric acid, is a slurry of potassium chloride produced by mixing 74.5 pounds (1 mol) of potassium chloride with the recycle acid stream in amount of 405.8 pounds consisting of 161 pounds nitric acid, 107.3 pounds water, 97 pounds potassium nitrate and 40.5 pounds sodium nitrate. This recycle acid stream contains 60% nitric acid on a salt-free basis. The temperature at the base of the reactor is 115° C. and at the top −5° C.

Also introduced into the reactor is a side stream removed from the acid concentrator employed in step 2 which side stream is in amount of 5 pounds and consists of 0.25 pound nitric acid, 4.45 pounds water, and 0.3 pound hydrochloric acid.

The vapors taken off overhead are cooled to a temperature of −25° C. The condensate thus produced is divided into two equal streams. One stream is returned as reflux, and the other stream is passed to the chlorine still where the nitrogen dioxide is separated from the chlorine. Each stream is in amount of about 81.5 pounds consisting of 35.5 pounds chlorine and 46.0 pounds nitrogen dioxide.

561.3 pounds of reactor bottoms are removed containing 50% nitric acid on a salt-free basis. The reactor bottoms contain 161.25 pounds nitric acid, 161.25 pounds water, 0.3 pound hydrochloric acid, 198 pounds potassium nitrate and 40.5 pounds sodium nitrate.

Step 2: The reactor bottoms are introduced into the acid concentrator operated at a temperature of 120° C. at its base and 100° C. at its top. The vapors taken overhead are condensed and the condensate divided into two streams. One of these is returned as reflux in amount of 34.65 pounds consisting entirely of water. The other stream consisting of 49.5 pounds water is passed to waste. Bottoms from the acid concentrator are removed in amount of 506.8 pounds consisting of 161 pounds nitric acid, 107.3 pounds water, 198 pounds potassium nitrate and 40.5 pounds sodium nitrate. It contains 60 weight percent nitric acid on a salt-free basis.

Step 3: The bottoms from the acid concentrator are cooled to 40° C. and introduced into the crystallizer. A slurry of crystals are withdrawn from the crystallizer and passed through a centrifuge. 101 pounds of potassium nitrate (1 mol) are removed from the centrifuge. The mother liquor in amount of 405.8 pounds consisting of 161 pounds nitric acid, 107.3 pounds water, 97 pounds potassium nitrate and 40.5 pounds sodium nitrate is recycled to the potassium chloride reactor. It contains 60 weight percent nitric acid on a salt-free basis.

Example III

This example is carried out in equipment of the type shown in FIGURE 2.

Step 1: 157.5 pounds of nitric acid of 80% concentration containing 126 pounds (2 mols) of nitric acid and 31.5 pounds of water are introduced into the potassium chloride reactor at a point where the temperature is about 90° C. Introduced into this reactor at approximately its midpoint, which is below the point of introduction of the nitric acid, is a slurry of potassium chloride with the recycle acid stream in amount of 824.25 pounds consisting of 329.75 pounds nitric acid, 220 pounds water, 198 pounds potassium nitrate and 76.5 pounds sodium nitrate. This recycle acid stream contains 60% nitric acid on a salt-free basis. The temperature at the base of the reactor is 115° C. and at the top −5° C.

The vapors taken off overhead are cooled to a temperature of −25° C. The condensate thus produced is divided into two streams. One stream is returned as reflux and the other stream is passed to the chlorine still where the nitrogen is separated from the chlorine. Each stream is in amount of 81.1 pounds consisting of 35.3 pounds chlorine and 45.8 pounds nitrogen dioxide.

975.2 pounds of reactor bottoms are removed containing 55% nitric acid on a salt-free basis. The reactor bottoms contain 330 pounds nitric acid, 269.5 pounds water, 0.2 pound hydrochloric acid, 299 pounds potassium nitrate and 76.5 pounds sodium nitrate.

Step 2: The reactor bottoms are introduced into the acid concentrator operated at a temperature of 120° C. at its base and 100° C. at its top. The vapors taken overhead are condensed and the condensate divided into two streams. One of these is returned as reflux in amount of 34.96 pounds consisting of 34.65 pounds water, 0.14 pound hydrochloric acid and 0.17 pound nitric acid. The other stream in amount of 49.95 pounds consisting of 49.5 pounds water, 0.2 pound hydrochloric acid and 0.25 pound nitric acid is passed to waste. Bottoms from the acid concentrator are removed in amount of 925.25 pounds consisting of 329.75 pounds nitric acid, 220 pounds water, 299 pounds potassium nitrate and 76.5 pounds sodium nitrate. It contains 60 weight percent nitric acid on a salt-free basis.

Step 3: The bottoms from the acid concentrator are cooled to 40° C. and introduced into the crystallizer. A slurry of crystals are withdrawn from the crystallizer and passed through a centrifuge. 101 pounds of potassium nitrate (1 mol) are removed from the centrifuge. The mother liquor in amount of 824.25 pounds consisting of 329.75 pounds nitric acid, 220 pounds water, 198 pounds potassium nitrate and 76.5 pounds sodium nitrate is recycled to the potassium chloride reactor. It contains 60 weight percent nitric acid on a salt-free basis.

Example IV

This example is carried out in equipment of the type shown in FIGURE 2.

Step 1: 157.5 pounds of nitric acid of 80° concentration containing 126 pounds (2 mols) of nitric acid and 31.5 pounds of water are introduced into the potassium chloride reactor at a point where the temperature is about 90° C. Introduced into this reactor at approximately its midpoint, which is below the point of introduction of the nitric acid, is a slurry of potassium chloride produced by mixing 74.5 pounds (1 mol) of potassium chloride with the recycle acid stream in amount of 412.5 pounds consisting of 177 pounds nitric acid, 95.5 pounds water, 98 pounds potassium nitrate and 42 pounds sodium nitrate. This recycle acid stream contains 65% nitric acid on a salt-free basis. The temperature at the base of the reactor is 115° C. and at the top −5° C.

The vapors taken off overhead are cooled to a temperature of −25° C. The condensate thus produced is divided into two streams. One stream is returned as reflux and the other stream is passed to the chlorine still where the nitrogen dioxide is separated from the chlorine. Each stream is in amount of 81.3 pounds consisting of 35.4 pounds chlorine and 45.9 pounds nitrogen dioxide.

563.1 pounds of reactor bottoms are removed containing 55% nitric acid on a salt-free basis. The reactor bottoms contain 177 pounds nitric acid, 145 pounds water, 0.1 pound hydrochloric acid, 199 pounds potassium nitrate and 42 pounds sodium nitrate.

Step 2: The reactor bottoms are introduced into the acid concentrator operated at a temperature of 120° C. at its base and 100° C. at its top. The vapors taken overhead are condensed and the condensate divided into two streams. One of these is returned as reflux in amount of 34.84 pounds consisting of 34.65 pounds water, 0.07 pound hydrochloric acid and 0.12 pound nitric acid. The other stream in amount of 49.77 pounds consisting of 49.5 pounds water, 0.1 pound hydrochloric acid and 0.17 pound nitric acid is passed to waste. Bottoms from the acid concentrator are removed in amount of 513.5 pounds consisting of 177 pounds nitric acid, 95.5 pounds water, 199 pounds potassium nitrate and 42 pounds sodium nitrate. It contains 65 weight percent nitric acid on a salt-free basis.

Step 3: The bottoms from the acid concentrator are cooled to 40° C. and introduced into the crystallizer. A slurry of crystals are withdrawn from the crystallizer and passed through a centrifuge. 101 pounds of potassium nitrate (1 mol) are removed from the centrifuge. The mother liquor in amount of 412.5 pounds consisting of 177 pounds nitric acid, 95.5 pounds water, 98 pounds potassium nitrate and 42 pounds sodium nitrate is recycled to the potassium chloride reactor. It contains 65 weight percent nitric acid on a salt-free basis.

It will be noted that the present invention provides a process of converting potassium chloride and other alkali metal and alkaline earth metal chlorides to the corresponding metal nitrate, which process results in high yields of metal nitrate in that substantially all of the alkali metal and alkaline earth metal is utilized in the process and this without producing nitrosyl chloride which, as a practical matter, must be oxidized to recover the nitrogen values thereof. Hence the present invention can be carried out in more simple and less expensive equipment, because it eliminates the necessity of using oxidation equipment comparable to the nitrosyl chloride oxidizers.

Moreover, the liquors produced in the processes of the present invention are of such character as to minimize corrosion problems entailed in their handling. In one modification involving the production of a reaction mixture in the first stage containing about 50 weight percent nitric acid on a salt-free basis and accordingly containing appreciable amounts of hydrochloric acid, the hydrochloric acid is concentrated in the distillation column employed in step 2 and a side stream containing the hydrochloric acid is removed from this distillation column and passed to the potassium chloride reactor. Thus the concentrated reaction mixture fed to the crystallizer is free of chloride, minimizing corrosion problems in the crystallizer, centrifugal separator, or other separating equipment employed in association with the crystallizer.

In the other modification in which the reaction mixture removed from step 1 contains about 55 or more weight percent nitric acid on a salt-free basis, the chloride content of this reaction mixture is so low that all of the chloride can conveniently be removed overhead in the distillation column effecting concentration of the reaction mixture. Here also the concentrated reaction mixture fed to the crystallizer is free of chloride.

Since certain changes may be made in carrying out the above described method of converting alkali metal and alkaline earth metal chlorides to the corresponding nitrates without departing from the scope of this invention, it is intended that all matter contained in the above description or shown in the accompanying drawings shall be interpreted as illustrative and not in a limiting sense. Thus while the invention has been described in connection with operations in the potassium chloride reactor and acid concentrator under atmospheric pressure conditions (pressure of about 1 atmosphere at the top of each column), these columns may be operated under pressures of two or three atmospheres or even higher superatmospheric pressures. The temperatures will, of course, be changed correspondingly; the mixtures in the bottoms of these columns are maintained boiling under the pressure conditions existing therein.

What is claimed is:

1. The process of converting a metal chloride from the group consisting of alkali metal and alkaline earth metal chlorides to the corresponding nitrate which comprises reacting nitric acid of at least 75% by weight concentration with said metal chloride in the proportions of about 2 mols of nitric acid per mol of metal chloride in a distillation column by flowing the nitric acid and metal chloride countercurrent to a rising stream of vapors in said column produced by boiling the reaction mixture while recycling through said column nitric acid having a concentration of from 50% to 65% by weight on a salt-free basis, thus producing in said column as the vapor product of reaction only chlorine and nitrogen dioxide, said recycled nitric acid being obtained as the mother liquor in the crystallization of metal nitrate from the reaction mixture produced in said column.

2. The process of converting potassium chloride to the corresponding nitrate which comprises reacting nitric acid of at least 75% by weight concentration with said potassium chloride in the proportions of about 2 mols of nitric acid per mol of potassium chloride in a distillation column by flowing the nitric acid and potassium chloride countercurrent to a rising stream of vapors in said column produced by boiling the reaction mixture while recycling through said column nitric acid having a concentration of from 50% to 65% by weight on a salt-free basis, thus producing in said column as the vapor product of reaction only chlorine and nitrogen dioxide, said recycled nitric acid being obtained as the mother liquor in the crystallization of potassium chloride from the reaction mixture produced in said column.

3. The process of converting a metal chloride from the group consisting of alkali metal and alkaline earth metal chlorides to the corresponding nitrate which comprises: step 1, feeding to a distillation column nitric acid of at least 80% concentration by weight and said metal chloride in the proportions of about 2 mols of nitric acid per mol of metal chloride, passing the metal chloride and nitric acid downwardly through said column countercurrent to a rising stream of vapors produced by heating the reaction mixture to its boiling point near the base of said column, condensing the vapors containing chlorine and nitrogen dioxide leaving the top of said column and returning as reflux to the top of said column a portion of the condensate, maintaining the top of said column at a temperature of −5° C. to −10° C., recycling through said column mother liquor derived from step 3 containing from 50% to 65% by weight of nitric acid on a salt-free basis; step 2, concentrating the reaction mixture from step 1 in a distillation column to drive off overhead water and remove as bottoms concentrated reaction mixture containing from 50% to 65% by weight nitric acid on a salt-free basis, and step 3, crystallizing metal nitrate from the concentrated reaction mixture from step 2, separating the metal nitrate crystals from the mother liquor and recycling the mother liquor through step 1.

4. The process of converting potassium chloride to potassium nitrate which comprises: step 1, feeding to a distillation column nitric acid of at least 80% concentration by weight and potassium chloride in the proportions of about 2 mols of nitric acid per mol of potassium chloride, passing the potassium chloride and nitric acid downwardly through said column countercurrent to a rising stream of vapors produced by heating the reaction mixture to its boiling point near the base of said column, condensing the vapors containing chlorine and nitrogen dioxide leaving the top of said column and returning as reflux to the top of said colum a portion of the condensate, maintaining the top of said column at a temperature of −5° C. to −10° C., recycling through said column mother liquor derived from step 3 containing from 50% to 65% by weight of nitric acid on a salt-free basis; step 2, concentrating the reaction mixture from step 1 in a distillation column to drive off overhead water and remove as bottoms concentrated reaction mixture containing from 50% to 65% by weight nitric acid on a salt-free basis; and step 3, crystallizing potassium nitrate from the concentrated reaction mixture from step 2, separating the potassium nitrate crystals from the mother liquor and recycling the mother liquor through step 1.

5. The process of converting potassium chloride to potassium nitrate which comprises: step 1, feeding to a distillation column nitric acid of about 80% by weight concentration and potassium chloride in the proportions of about 2 mols of nitric acid per mol of potassium chloride, passing the potassium chloride and nitric acid downwardly through said column countercurrent to a rising stream of vapors of chlorine and nitrogen dioxide produced by heating the reaction mixture to its boiling point near the base of said column, condensing said vapors leaving the top of said column and returning as a reflux to the top of said column a portion of the condensate, maintaining the top of said column at a temperature of about —5° C., recycling through said column mother liquor derived from step 3 containing 55% by weight of nitric acid on a salt-free basis; step 2, concentrating the reaction mixture from step 1 in a distillation column to drive off water overhead, removing a side stream from said column containing hydrochloric acid and introducing said side stream into the distillation column employed in step 1 and removing as bottoms from said column of step 2 a concentrated reaction mixture containing 55% nitric acid on a salt-free basis; and step 3, crystallizing the potassium nitrate from the concentrated reaction mixture removed from step 2, separating the potassium nitrate crystals from the mother liquor containing 55% by weight nitric acid on a salt-free basis and recycling the mother liquor through the distillation column employed in step 1.

6. The process of converting potassium chloride to potassium nitrate which comprises: step 1, feeding to a distillation column nitric acid of about 80% by weight concentration and potassium chloride in the proportions of about 2 mols of nitric acid per mol of potassium chloride, passing the potassium chloride and nitric acid downwardly through said column countercurrent to a rising stream of vapors of chlorine and nitrogen dioxide produced by heating the reaction mixture to its boiling point near the base of said column and returning as reflux to the top of said column a portion of the condensate, maintaining the top of said column at a temperature of about —5° C., recycling through said column mother liquor derived from step 3 containing 60% by weight of nitric acid on a salt-free basis; step 2, concentrating the reaction mixture from step 1 in a distillation column to drive off overhead water, removing a side stream from said column containing up to about 12% hydrochloric acid and introducing said side stream into the distillation column employed in step 1 and removing as bottoms from said column of step 2 a concentrated reaction mixture containing 60% nitric acid on a salt-free basis; and step 3, crystallizing the potassium nitrate from the concentrated reaction mixture removed from step 2, separating the potassium nitrate crystals from the mother liquor containing 60% by weight nitric acid on a salt-free basis and recycling the mother liquor through the distillation column employed in step 1.

7. The process of converting potassium chloride to potassium nitrate which comprises: step 1, feeding to a distillation column nitric acid of about 80% by weight concentration and potassium chloride in the proportions of about 2 mols of nitric acid per mol of potassium chloride, passing the potassium chloride and nitric acid downwardly through said column countercurrent to a rising stream of vapors of chlorine and nitrogen dioxide produced by heating the reaction mixture to its boiling point near the base of said column, condensing said vapors leaving the top of said column and returning a portion of the condensate as reflux to the top of said column at a temperature of about —5° C., recycling through said column mother liquor derived from step 3 containing 60% by weight of nitric acid on a salt-free basis; step 2, concentrating the reaction mixture from step 1 in a distillation column to drive off water overhead, and removing as bottoms from said column of step 2 a concentrated reaction mixture containing 60% nitric acid on a salt-free basis; and step 3, crystallizing the potassium nitrate from the concentrated reaction mixture removed from step 2, separating the potassium nitrate crystals from the mother liquor containing 60% by weight nitric acid on a salt-free basis and recycling the mother liquor through the distillation column employed in step 1.

8. The process of converting potassium chloride to potassium nitrate which comprises: step 1, feeding to a distillation column nitric acid of about 80% by weight concentration and potassium chloride in the proportions of about 2 mols of nitric acid per mol of potassium chloride, passing the potassium chloride and nitric acid downwardly through said column countercurrent to a rising stream of vapors of chlorine and nitrogen dioxide produced by heating the reaction mixture to its boiling point near the base of said column, condensing said vapors leaving the top of said column and returning as reflux to the top of said column a portion of the condensate, maintaining the top of said column at a temperature of about —5° C., recycling through said column mother liquor derived from step 3 containing 65% by weight of nitric acid on a salt-free basis; step 2, concentrating the reaction mixture from step 1 in a distillation column to drive off water overhead, and removing as bottoms from said column of step 2 a concentrated reaction mixture containing 65% nitric acid on a salt-free basis; and step 3, crystallizing the potassium nitrate from the concentrated reaction mixture removed from step 2, separating the potassium nitrate crystals from the mother liquor containing 65% by weight nitric acid on a salt-free basis and recycling the mother liquor through the distillation column employed in step 1.

References Cited in the file of this patent
UNITED STATES PATENTS
2,138,016 Beekhuis _____ Nov. 29, 1938